(12) United States Patent  (10) Patent No.: US 8,449,165 B2
Chen  (45) Date of Patent: May 28, 2013

(54) BACKLIGHT MODULE HAVING HOUSING PROVIDED WITH GROOVE STRUCTURE

(75) Inventor: Tsan-Jung Chen, New Taipei (TW)

(73) Assignee: Kocam International Co. Ltd. (TW)

( * ) Notice: Subject to any disclaimer, the term of this patent is extended or adjusted under 35 U.S.C. 154(b) by 111 days.

(21) Appl. No.: 13/223,571

(22) Filed: Sep. 1, 2011

(65) Prior Publication Data

US 2013/0058125 A1  Mar. 7, 2013

(51) Int. Cl.
  *F21V 7/00*  (2006.01)
(52) U.S. Cl.
  USPC ............... 362/613; 362/614; 362/632
(58) Field of Classification Search
  CPC ...................... F21V 7/22; G09F 1/00
  USPC ............. 362/613, 614, 615, 628, 632–634, 362/623
  See application file for complete search history.

(56) References Cited

U.S. PATENT DOCUMENTS

| 8,235,541 B2* | 8/2012 | Chen ........................ 362/97.3 |
| 2009/0251634 A1* | 10/2009 | Lu et al. ....................... 349/58 |
| 2010/0073959 A1* | 3/2010 | Hamada ....................... 362/611 |

* cited by examiner

*Primary Examiner* — Tracie Y Green

(57) ABSTRACT

The present invention relates to a backlight module having housing provided with groove structure, wherein the backlight module comprises: a housing, a plurality of LED chips, a thermal conductive layer, a reflector, and a light guide plate. In which, the housing has a groove formed on a housing bottom thereof, and the circuit layer is disposed in the groove through a first thermally conductive insulating layer. In addition, the plurality of LED chips are disposed in the housing and welded on the circuit layer. In the present invention, the circuit layer and the LED chips are disposed in the groove of the housing, therefore, when mass producing the backlight module, it is able to ensure that the position of LED chips would correspond to the circuit layer in the housing, such that each the backlight module manufactured by mass production can be used for providing a stable light source.

20 Claims, 12 Drawing Sheets

BACKLIGHT MODULE HAVING HOUSING PROVIDED WITH GROOVE STRUCTURE

BACKGROUND OF THE INVENTION

1. Technical Field

The present invention relates to a backlight module, and more particularly, to a backlight module having housing provided with groove structure, in which the groove structure is formed on the bottom of the housing for assisting in the position of the circuit layer and the LED chips.

2. Description of Related Art

Light-emitting diode (LED) is light-emitting devices being widely applied. LED include many advantages, such as small volume and long lifetime, so that the LED are broadly used in human life.

LED is common applied in the lighting device and the backlight module, please refer to FIG. 1 and FIG. 2, there are shown a side view and a stereo view of a conventional LED backlight module. As shown in FIG. 1 and FIG. 2, the conventional LED backlight module 1' includes: a housing 11', a circuit layer 12', a reflector 14', a plurality of LED chips 13', a light guide plate 15', and a bottom reflector 16'. The circuit layer 12' is attracted on the inner surface of the housing 11' through a thermally conductive insulating layer 17'. The reflector 14' is disposed in the housing 11' and located over the circuit layer 12'. The LED chips 13' are disposed in the housing 11' and located on the circuit layer 12', moreover, the LED chips 13' respectively pass through a plurality of openings 141' of the reflector 14'. The light guide plate 15' is accommodated by the housing 11' and over the LED chips 13', wherein the light guide plate 15' is able to receive the light emitted from the LED chips 13' by a light incident surface thereof.

The aforesaid backlight module 1' is widely used in LCD display, and the main advantages of the backlight module 1' are simple structure and easy manufacturing process. Besides, the housing 11' would be made to a ⊓-shaped housing for giving the LED chips more protection. Although the backlight module 1' has many advantages, it still include the drawbacks and shortcomings as follows:

When manufacturing the backlight module 1', the LED chips 13' and the circuit layer 12' are disposed into the housing 11' after the LED chips 13' are welded on the circuit layer 12'. So that, because the housing 11' is not provided with the position structures for the LED chips 13' and the circuit layer 12', it is unable to ensure that the position of LED chips 13' would correspond to the circuit layer 12' in the housing 11' when mass producing the backlight module 1', such that each the backlight module 1' manufactured by mass production can not provide a stable light source.

Accordingly, in view of the conventional backlight module still has shortcomings and drawbacks, the inventor of the present application has made great efforts to make inventive research thereon and eventually provided a backlight module having housing provided with groove structure.

BRIEF SUMMARY OF THE INVENTION

The primary objective of the present invention is to provide a backlight module having housing provided with groove structure, in which, a groove is formed on the bottom of a housing for accommodating the circuit layer and the LED chips, therefore, when mass producing the backlight module, it is able to ensure that the position of LED chips would correspond to the circuit layer in the housing, such that each the backlight module manufactured by mass production can be used for providing a stable light source.

Accordingly, to achieve the primary objective of the present invention, the inventor proposes a backlight module having housing provided with groove structure, comprising:

- a housing, having a groove formed on a housing bottom thereof;
- a circuit layer, disposed in the groove through a first thermally conductive insulating layer;
- a plurality of LED chips, disposed in the housing and welded on the circuit layer;
- a thermal conductive layer, attached to the surface of the circuit layer through a second thermally conductive insulating layer and having a bottom portion provided with a plurality of first holes, wherein the LED chips respectively pass through the first holes when the thermal conductive layer is attached to the surface of the circuit layer;
- a reflector, opposite to the LED chips and disposed in the housing, wherein the reflector has a reflector bottom portion provided with a plurality of second holes, and the light emitted by the light-emitting surface of the LED chips may pass though the second holes for outputting; and
- a light guide plate, disposed in the reflector for receiving the light emitted by the LED chips.

The another objective of the present invention is to provide a backlight module having housing provided with groove structure, in which, the housing of the backlight module is made of non-metal material, and the bottom of the housing is provided with a groove for accommodating the circuit layer and the LED chips, therefore, when mass producing the backlight module, it is able to ensure that the position of LED chips would correspond to the circuit layer in the housing, such that each the backlight module manufactured by mass production can be used for providing a stable light source.

Thus, in order to achieve the primary objective of the present invention, the inventor proposes a backlight module having housing provided with groove structure, comprising:

- a housing, having a groove formed on a housing bottom thereof;
- a circuit layer, disposed in the groove;
- a plurality of LED chips, disposed in the housing and welded on the circuit layer;
- a light guide plate, disposed in the housing for receiving the light emitted by the LED chips; and
- a bottom reflector, disposed on the bottom of the light guide for preventing from the light leakage.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe a backlight module having housing provided with groove structure according to the present invention, embodiments of the present invention will be described in detail with reference to the attached drawings hereinafter.

Figure 1:
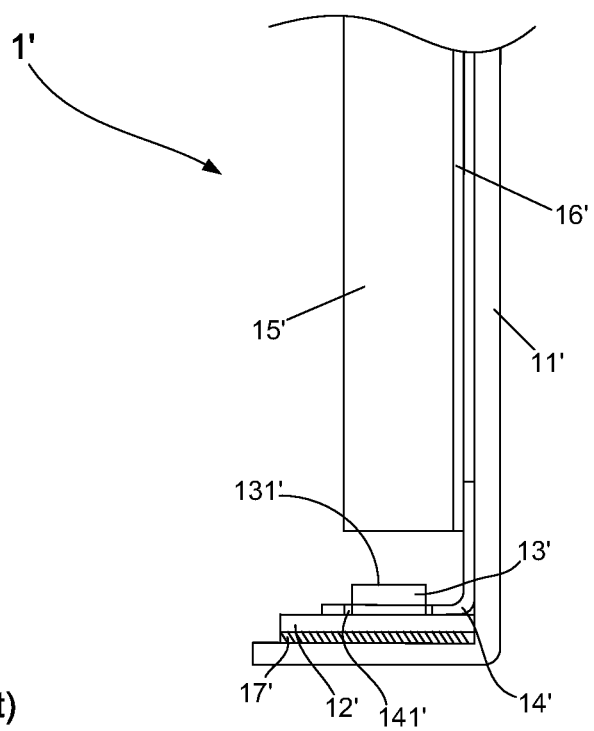
FIG. 1 is a side view of a conventional LED backlight module.
Figure 2:
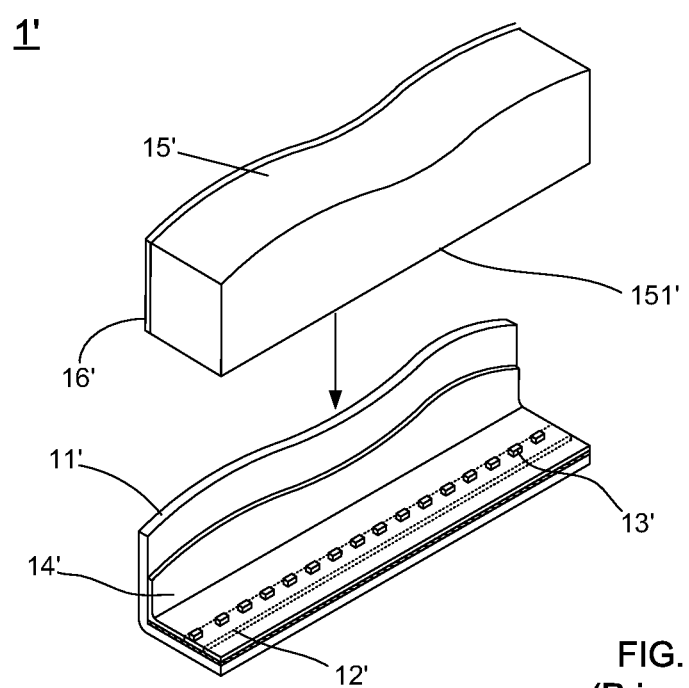
FIG. 2 is a stereo view of the conventional LED backlight module.
Figure 3:
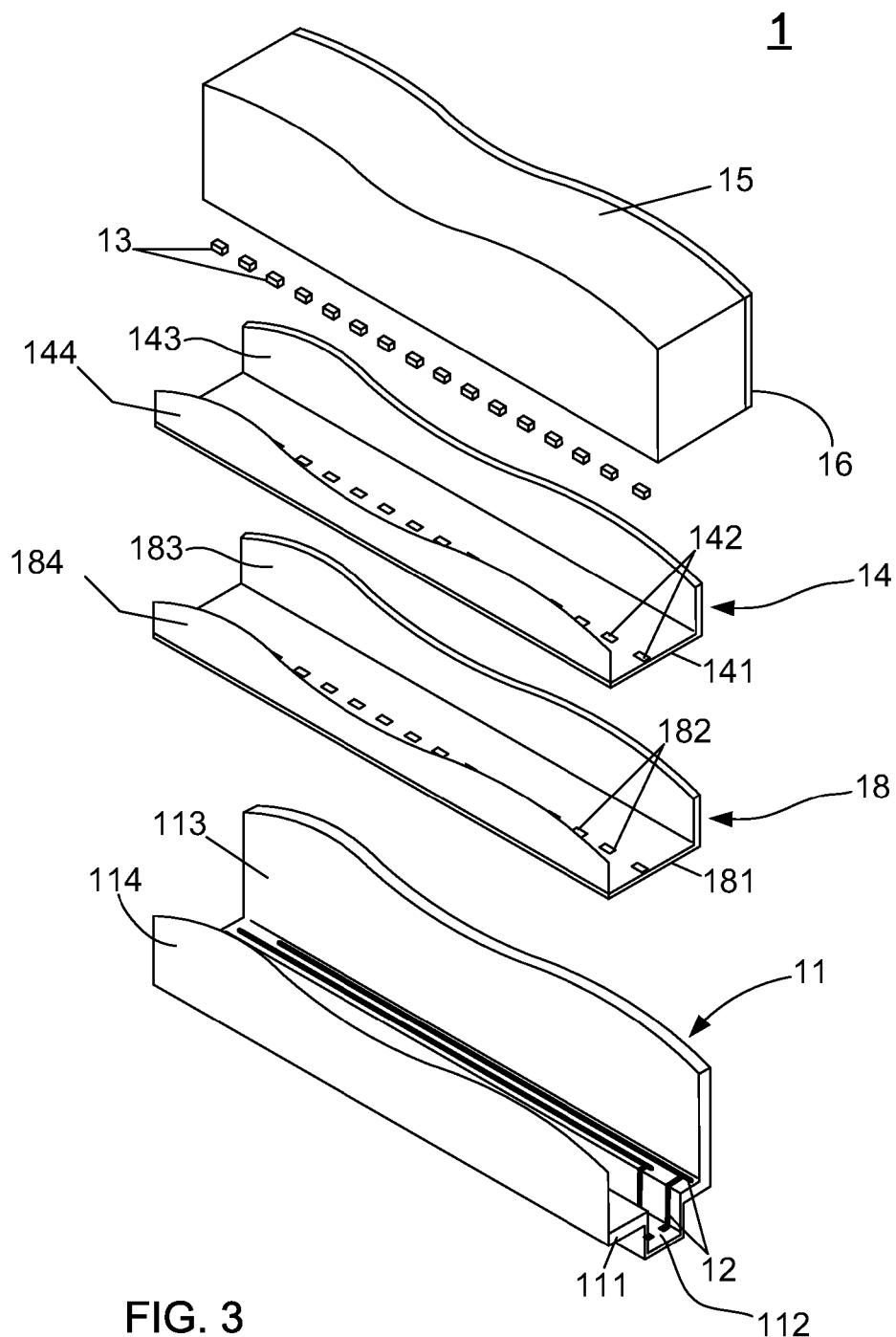
FIG. 3 is an exploded view of a backlight module having housing provided with groove structure according to the present invention.
Figure 4:
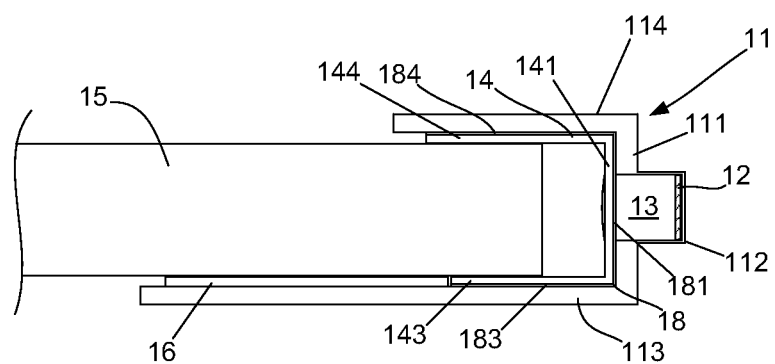
FIG. 4 is a side view of the backlight module having housing provided with groove structure according to the present invention.

Please refer to FIG. 3 and FIG. 4, there are shown an exploded view and a side view of a backlight module having housing provided with groove structure according to the present invention. As shown in FIG. 3 and FIG. 4, the backlight module 1 having housing provided with groove structure includes: a housing 11, a circuit layer 12, a plurality of LED chips 13, a thermal conductive layer 18, reflector 15. and a bottom reflector 16, wherein the housing 11 has a housing bottom 111, a housing long portion 113 and a housing short portion 114, and a groove 112 is formed on the housing bottom 111. The circuit layer 12 is disposed in the groove 112 through a first thermally conductive insulating layer (not shown); Moreover, for increasing the area of the circuit layer 12, as shown in FIG. 3, the circuit layer 12 disposed in the groove 112 can be extended to the housing long portion 113 and the housing short portion 114 when manufacturing the backlight module 1 having housing provided with groove structure.

Continuously referring to FIG. 3 and FIG. 4, the plurality of LED chips 13 are disposed in the housing 11 and welded on the circuit layer 12. The thermal conductive layer 18 is generally made of metal material having high thermal conductivity, so that the thermal conductive layer 18 is attached to the surface of the circuit layer 12 through a second thermally conductive insulating layer (not shown), such that the short circuits would not produced between the thermal conductive layer 18 and the circuit layer 12. The thermal conductive layer 18 includes a bottom portion 181, a long portion 183 and a short portion 184, wherein the bottom portion 181 provided with a plurality of first holes 182, and the LED chips 13 are able to respectively pass through the first holes 182 when the thermal conductive layer 18 is attached to the surface of the circuit layer 12.

The reflector 14 is opposite to the LED chips 13 and disposed in the housing 11, wherein the reflector 14 has a reflector bottom portion 111, a reflector long portion 143 and a reflector short portion 144. The reflector bottom portion 111 is provided with a plurality of second holes 142, and the light emitted by the light-emitting surface of the LED chips 13 may pass though the second holes 142 for outputting. The light guide plate 15 is disposed in the reflector 14 for receiving the light emitted by the LED chips 13. In addition, The bottom reflector 16 is disposed on the bottom of the light guide 15 for preventing from the light leakage. Moreover, for the framework of the backlight module 1 having housing with groove structure, the long portion 183 and the short portion 184 of the thermal conductive layer 18 are respectively attached to the housing long portion 113 and the housing short portion 114 when the circuit layer 12, the LED chips 13, the thermal conductive layer 18, and the reflector 15 are accommodated by the housing 11; Therefore, when the LED chips emit light, the thermal conductive layer 18 can conduct the heat spread on the circuit layer 12 to the housing 11, and then the heat would be dissipated via the housing 11.

Figure 5:
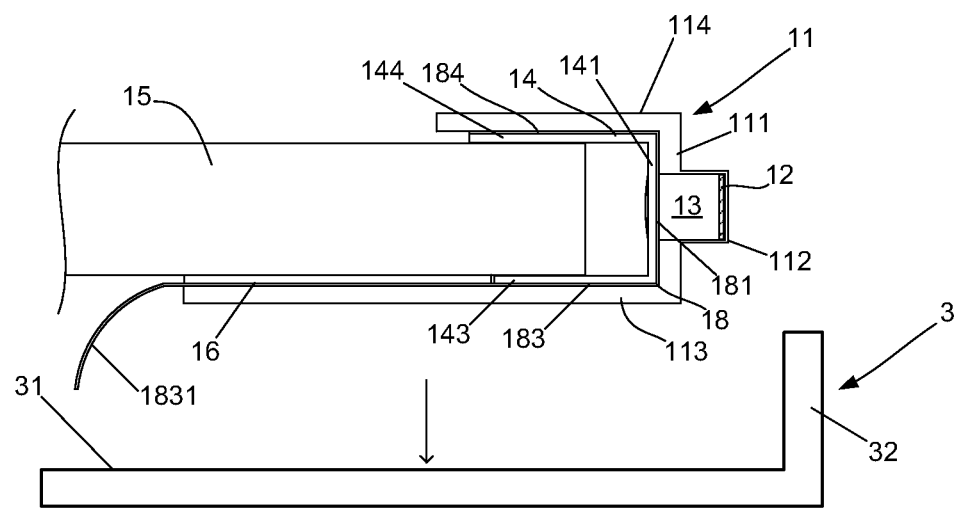
FIG. 5 is a second side view of the backlight module having housing provided with groove structure according to the present invention.

Moreover, please refer to FIG. 5, which illustrates a second side view of the backlight module having housing provided with groove structure according to the present invention. As shown in FIG. 5, the long portion 183 of the thermal conductive layer 18 may be extended to the outside of the housing 11 along the housing long portion 113, and the end of the long portion 183 can be formed a thermal conductive tassel 1831; Therefore, when the backlight module 1 of the present invention is installed to an external main frame 3 having at least one edge 32 and a bottom plate 31, the thermal conductive tassel 1831 can be completely and compactly attached to the bottom plate 31 of the external main frame 3, and then the heat dissipated by the housing 11 may be further transmitted to the far-end of the bottom plate 31, such that the bottom plate 31 gets a uniform surface temperature.

Figure 6:
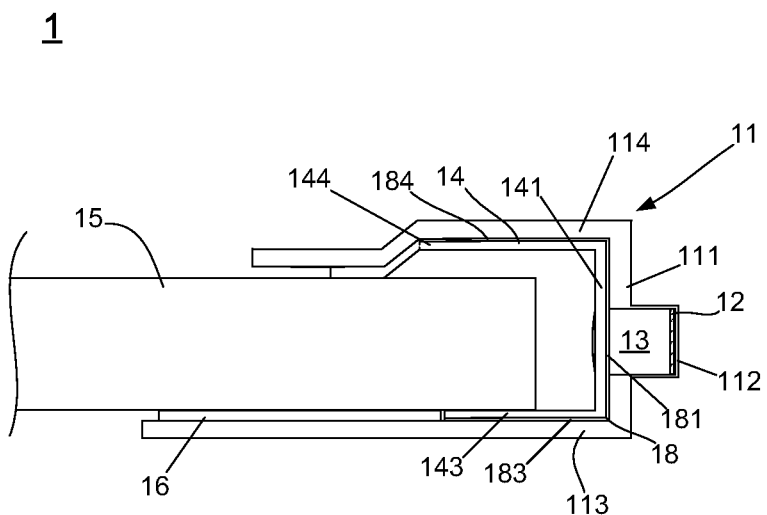
FIG. 6 is a third side view of the backlight module having housing provided with groove structure according to the present invention.

In addition, in the framework of the backlight module 1 having housing provided with groove structure, the manufacturing material of the housing 11 can be copper, aluminum, galvanized steel sheet, or hot-dip galvanized steel sheet, and the appearance shape of the housing 11 can be L-shape or ⊓-shape; Similarly, the appearance shape of the reflector 14 can be L-shape or ⊓-shape; Please refer to FIG. 6, which illustrates a third side view of the backlight module having housing provided with groove structure according to the present invention. As shown in FIG. 6, if the appearance shape of reflector 14 is ⊓-shape, the reflector short portion 144 can be designed to be bendable for facilitating the manufacture and assembly.

Figure 7:
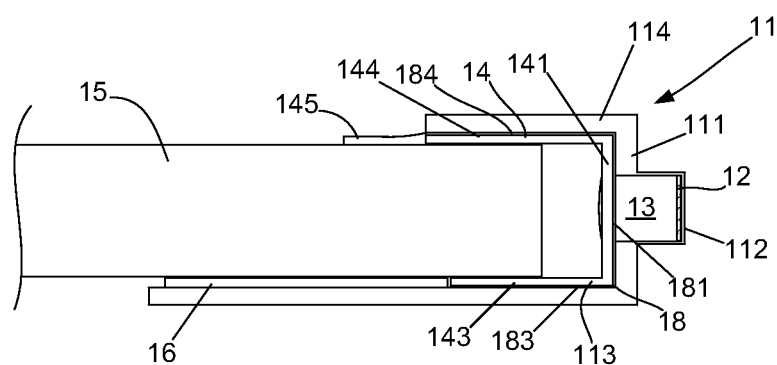
FIG. 7 is a fourth side view of the backlight module having housing provided with groove structure according to the present invention.

Furthermore, please refer to FIG. 7, which illustrates a fourth side view of the backlight module having housing provided with groove structure according to the present invention. As shown in FIG. 7, the end of the reflector short portion 144 can be formed a reflector tassel 145, wherein when the light guide plate 15 accommodated by the reflector 14, the reflector tassel 145 can be completely and compactly attached to the top surface of the light guide plate 15 for preventing from the light leakage occurring at the gap between the light guide plate 15 and the reflector short portion 144.

Thus, through above descriptions, the framework and the structure of backlight module having housing provided with groove structure have been clearly and completely introduced, in summary, the structure of backlight module having housing provided with groove structure of the present invention includes the features and the advantages as follows:

In the present invention, it is formed a groove 112 on the housing bottom 111 of the housing 11 for assisting the position of the circuit layer 12 and the LED chips when they are disposed in the housing 11; therefore, it may ensure that the position of LED chips 13 would correspond to the circuit layer 12 in the housing 11, and then each the backlight module manufactured by mass production can be used for providing a stable light source.

Figure 8:
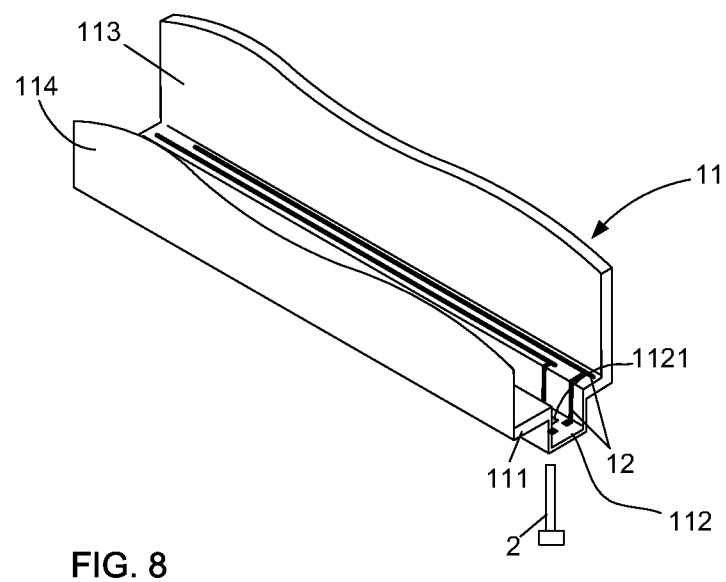
FIG. 8 is an exploded view of another practical embodiment of a housing in the backlight module having housing provided with groove structure.

In addition, for facilitating removing the LED chips from the groove 112 when the LED chips are de-soldered, the present invention further includes another practical embodiment for the housing 11. Please refer to FIG. 8, which illustrates an exploded view of another practical embodiment of the housing in the backlight module having housing provided with groove structure. As shown in FIG. 8, for another practical embodiment of the housing 11, a plurality of through holes 1121 are further formed on the bottom of the groove 112, and the through holes 1121 are used for assisting in removing the LED chips 13 from the groove 112 when the LED chips 13 are de-soldered. As shown in FIG. 8, when de-soldering the LED chips 13, it must heat the housing for melting the solder and use a pushing member 2 to push out the LED chip 13 via the through hole 1121, then the LED chip 13 can be removed from the groove 112.

Besides, it is well-known that the heat dissipation of the backlight module can not be considered when the low power LED chips are used as light-emitting devices of the backlight module; so that, when using the low power LED chips as light-emitting devices, the backlight module manufacturer would use the non-metal material for fabricating the housing of the backlight module. For above reasons, the present invention also provides a second embodiment for the backlight module having housing provided with groove structure.

Figure 9:
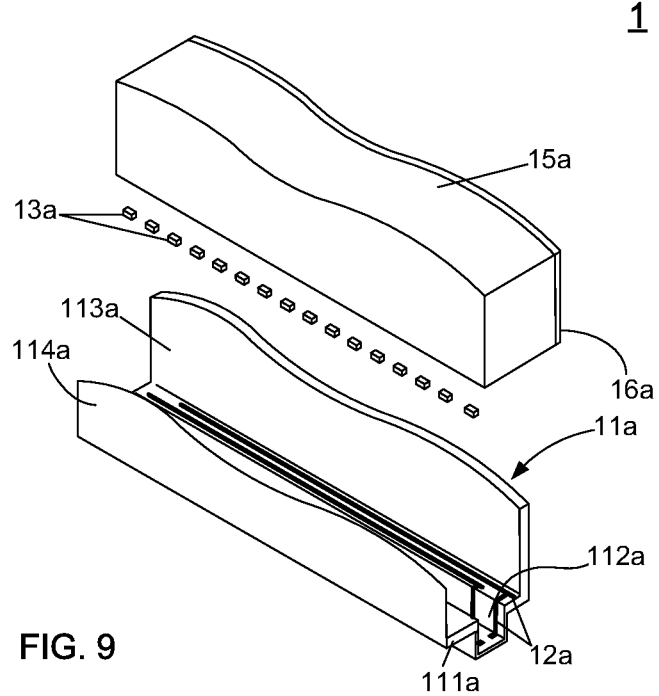
FIG. 9 is an exploded view of a second embodiment of the backlight module having housing provided with groove structure according to the present invention.
Figure 10:
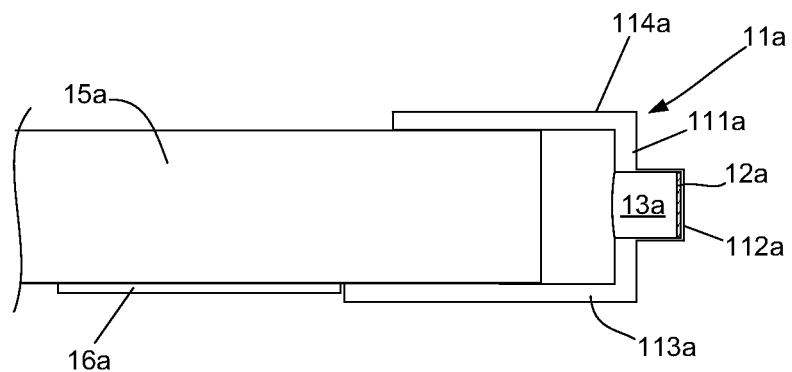
FIG. 10 is a side view of the second embodiment of the backlight module having housing provided with groove structure according to the present invention.

Please refer to FIG. 9 and FIG. 10, there are shown an exploded view and a side view of the second embodiment of the backlight module having housing provided with groove structure according to the present invention. As shown in FIG. 9 and FIG. 10, the second embodiment of the backlight module 1 having housing provided with groove structure includes: a housing 11a, a circuit layer 12a, a plurality of LED chips 13a, a light guide plate 15a, and a bottom reflector 16a, wherein the housing 11a includes a housing bottom 111a, a housing long portion 113a and a housing short portion 114a provided with a groove 112a. The plurality of LED chips 13a are welded on the circuit layer 12a, and the LED chips 13a and the circuit layer 12a are accommodated by the housing 11a and disposed in the groove 112a. The same as the afore said embodiment, in the second embodiment of the backlight module 1, for increasing the area of the circuit layer 12a, the circuit layer 12a disposed in the groove 112a can be extended to the housing long portion 113a and the housing short portion 114a when manufacturing the backlight module 1.

Continuously referring to FIG. 9 and FIG. 10, the light guide plate, being disposed in the housing for receiving the light emitted by the LED chips 13, and bottom reflector 16a is disposed on the bottom of the light guide 15a for preventing from the light leakage. For the second embodiment of the backlight module 1, the manufacturing material of the housing 11a can be high reflectivity polyester film, plastic, and fiberglass, and the appearance shape of the housing 11a can be L-shape or ⊓-shape. Moreover, it must note that, if the housing 11a is made of the plastic (PC) or the fiberglass (FR4), the inner surface of the housing 11a can be further coated with a reflecting layer, which is able to reflect the light emitted by the LED chips 13a for making the most light able to get into the light guide plate 15a, such that the light utilization efficiency of the backlight module 1 may be increased.

Inheriting to the descriptions in the previous paragraph, the same to the aforesaid embodiment, in the second embodiment of the backlight module having housing provided with groove structure, a plurality of through holes are further (not shown in FIG. 9 and FIG. 10) formed on the bottom of the groove 112a, and the through holes are used for assisting in removing the LED chips 13a from the groove 112a when the LED chips 13a are de-soldered. When de-soldering the LED chips 13a, it must put the housing 11a in a heating environment for melting the solder and use a pushing member (not shown in FIG. 9 and FIG. 10) to push out the LED chip 13a via the through hole 1121a, then the LED chip 13a can be removed from the groove 112a.

Figure 11:
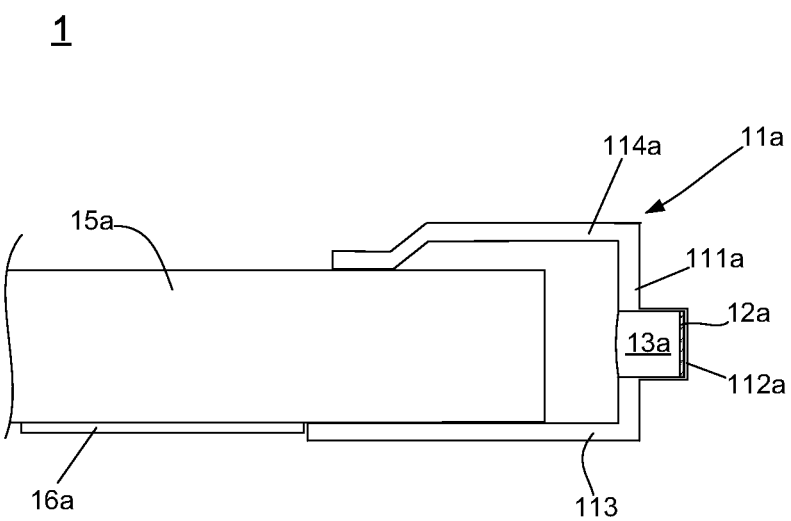
FIG. 11 is a second side view of the second embodiment of the backlight module having housing provided with groove structure according to the present invention.
Figure 12:
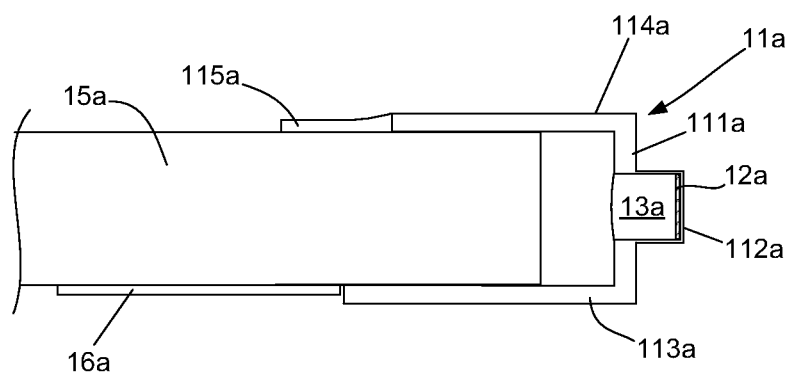
FIG. 12 is a third side view of the second embodiment of the backlight module having housing provided with groove structure according to the present invention.

In addition, please refer to FIG. 11, which illustrates a second side view of the second embodiment of the backlight module having housing provided with groove structure according to the present invention. In the framework of the second embodiment of the backlight module 1 having housing provided with groove structure, the appearance shape of housing 11a is ⊓-shape, and the housing short portion 114a can be designed to be bendable for facilitating the manufacture and assembly. Furthermore, please refer to FIG. 12, which illustrates a third side view of second embodiment of the backlight module having housing provided with groove structure according to the present invention. As shown in FIG. 12, the appearance shape of housing 11a is ⊓-shape, and the end of the housing short portion 1114a can be formed a housing tassel 115a, wherein when the light guide plate 15a accommodated by the housing 11a, the housing tassel 115a can be completely and compactly attached to the top surface of the light guide plate 15a for preventing from the light leakage occurring at the gap between the light guide plate 15a and the housing short portion 114a.

Therefore, the above descriptions have been clearly and completely introduced the all embodiments for the backlight module having housing provide with groove structure according to the present invention. However, the above description is made on embodiments of the present invention. However, the embodiments are not intended to limit scope of the present invention, and all equivalent implementations or alterations within the spirit of the present invention still fall within the scope of the present invention.

I claim:

1. A backlight module having housing provided with groove structure, comprising:
   a housing, having a groove formed on a housing bottom thereof;
   a circuit layer, being disposed in the groove through a first thermally conductive insulating layer;
   a plurality of LED chips, being disposed in the housing and welded on the circuit layer;
   a thermal conductive layer, being attached to the surface of the circuit layer through a second thermally conductive insulating layer and having a bottom portion provided with a plurality of first holes, wherein the LED chips respectively pass through the first holes when the thermal conductive layer is attached to the surface of the circuit layer;
   a reflector, being opposite to the LED chips and disposed in the housing, wherein the reflector has a reflector bottom portion provided with a plurality of second holes, and the light emitted by the light-emitting surface of the LED chips may pass though the second holes for outputting; and
   a light guide plate, being disposed in the reflector for receiving the light emitted by the LED chips.

2. The backlight module having housing provided with groove structure of claim 1, further comprising a bottom reflector, which is disposed on the bottom of the light guide for preventing from the light leakage.

3. The backlight module having housing provided with groove structure of claim 2, wherein the appearance shape of the housing is selected from group consisting of: L-shape and ⊓-shape.

4. The backlight module having housing provided with groove structure of claim 1, wherein the manufacturing material of the housing is selected from the group consisting of: copper, aluminum, galvanized steel sheet, and hot-dip galvanized steel sheet.

5. The backlight module having housing provided with groove structure of claim 3, wherein the housing with the ⊓-shaped appearance further comprises a housing long portion and a housing short portion, and the housing short portion can be bent for facilitating the manufacture and assembly.

6. The backlight module having housing provided with groove structure of claim 1, wherein the appearance shape of the reflector is selected from group consisting of: L-shape and ⊓-shape.

7. The backlight module having housing provided with groove structure of claim 3, wherein the reflector with the ⊓-shaped appearance further comprises a reflector long portion and a reflector short portion, and the reflector short portion can be bent for facilitating the manufacture and assembly.

8. The backlight module having housing provided with groove structure of claim 7, wherein the reflector with the ⊓-shaped appearance further comprises a reflector long portion and a reflector short portion, and the end of reflector short portion being formed a reflector tassel.

9. The backlight module having housing provided with groove structure of claim 5, wherein the thermal conductive layer further comprises a long portion and a short portion, and the long portion and the short portion being respectively attached to the housing long portion and the housing short portion when the circuit layer, the LED chips, the thermal conductive layer, and the reflector are accommodated by the housing.

10. The backlight module having housing provided with groove structure of claim 5, wherein the circuit layer disposed in the groove can be extended to the housing long portion and the housing short portion.

11. The backlight module having housing provided with groove structure of claim 9, wherein the long portion of the thermal conductive layer can be extended to the outside of the housing along the housing long portion, moreover, the end of the long portion being formed a thermal conductive tassel for completely and compactly being attached to a bottom plate of an external main frame.

12. The backlight module having housing provided with groove structure of claim 1, wherein a plurality of through holes are further formed on the bottom of the groove, and through holes are used for assisting in removing the LED chips from the groove when the LED chips are de-soldered.

13. A backlight module having housing provided with groove structure, comprising:
    a housing, having a groove formed on a housing bottom thereof;
    a circuit layer, being disposed in the groove;
    a plurality of LED chips, being disposed in the housing and welded on the circuit layer;
    a light guide plate, being disposed in the housing for receiving the light emitted by the LED chips; and
    a bottom reflector, being disposed on the bottom of the light guide for preventing from the light leakage.

14. The backlight module having housing provided with groove structure of claim 13, wherein the appearance shape of the housing is selected from group consisting of: L-shape and ⊓-shape.

15. The backlight module having housing provided with groove structure of claim 13, wherein the manufacturing material of the housing is selected from the group consisting of: high reflectivity polyester film, plastic, and fiberglass.

16. The backlight module having housing provided with groove structure of claim 14, wherein the housing with the ⊓-shaped appearance further comprises a housing long portion and a housing short portion, and the housing short portion can be bent for facilitating the manufacture and assembly.

17. The backlight module having housing provided with groove structure of claim 14, wherein the housing with the ⊓-shaped appearance further comprises a housing long portion and a housing short portion, and the end of the housing short portion being formed a housing tassel.

18. The backlight module having housing provided with groove structure of claim 17, wherein the circuit layer disposed in the groove can be extended to the housing long portion and the housing short portion.

19. The backlight module having housing provided with groove structure of claim 15, further comprising a reflecting layer coated on the inner surface of the housing.

20. The backlight module having housing provided with groove structure of claim 13, wherein a plurality of holes are further formed on the bottom of the groove, and through holes are used for assisting in removing the LED chips from the groove when the LED chips are de-soldered.

* * * * *